(12) United States Patent
Yoon et al.

(10) Patent No.: US 11,831,069 B2
(45) Date of Patent: Nov. 28, 2023

(54) ELECTRONIC DEVICE

(71) Applicants: Samsung Display Co., Ltd., Yongin-Si (KR); Seoul National University, Seoul (KR)

(72) Inventors: Sangrock Yoon, Hwaseong-si (KR); Kiseo Kim, Yongin-si (KR); Eunjin Sung, Yongin-si (KR); Byeongjin Kim, Seoul (KR); Jungsuek Oh, Seoul (KR); Jeongtaek Oh, Seoul (KR); Seungwook Chun, Daegu (KR)

(73) Assignees: SAMSUNG DISPLAY CO., LTD., Yongin-Si (KR); SEOUL NATIONAL UNIVERSITY, Seoul (KR)

( * ) Notice: Subject to any disclaimer, the term of this patent is extended or adjusted under 35 U.S.C. 154(b) by 0 days.

(21) Appl. No.: 17/835,342

(22) Filed: Jun. 8, 2022

(65) Prior Publication Data

US 2023/0102117 A1 Mar. 30, 2023

(30) Foreign Application Priority Data

Sep. 27, 2021 (KR) .......................... 10-2021-0126924

(51) Int. Cl.
*H01Q 1/24* (2006.01)
*H01Q 1/38* (2006.01)
*H01Q 13/16* (2006.01)
*H01Q 9/42* (2006.01)
*H01Q 19/10* (2006.01)
*H04M 1/02* (2006.01)
*H01Q 13/22* (2006.01)

(52) U.S. Cl.
CPC ............... *H01Q 1/243* (2013.01); *H01Q 1/38* (2013.01); *H01Q 9/42* (2013.01); *H01Q 13/16* (2013.01); *H01Q 13/22* (2013.01); *H01Q 19/10* (2013.01); *H04M 1/0266* (2013.01); *H04M 1/0277* (2013.01); *H04M 2201/38* (2013.01)

(58) Field of Classification Search
CPC ........ H01Q 10/10; H01Q 13/22; H01Q 13/16; H01Q 9/42; H01Q 1/38; H01Q 1/243
See application file for complete search history.

(56) References Cited

U.S. PATENT DOCUMENTS 10,693,214 B2   6/2020   Kim et al.
2021/0013626 A1 1/2021   Jang et al.

FOREIGN PATENT DOCUMENTS

KR   10-2019-0069226 A   6/2019
KR   10-2021-0007526 A   1/2021

*Primary Examiner* — Graham P Smith
(74) *Attorney, Agent, or Firm* — Innovation Counsel LLP

(57) ABSTRACT

Provided is an electronic device comprising a display module including a display area on which an image is displayed and a non-display area adjacent to the display area, a lower module disposed below the display module to support the display module, a signal radiation pattern, wherein an opening for radiating an antenna signal to an outside is defined in the signal radiation pattern and disposed to overlap the non-display area in the display module, a signal transmission pattern disposed between the display module and the lower module to radiate the antenna signal toward the signal radiation pattern, and an antenna controller disposed below the lower module to provide the antenna signal to the signal transmission pattern.

20 Claims, 14 Drawing Sheets

ELECTRONIC DEVICE

CROSS-REFERENCE TO RELATED APPLICATIONS

This U.S. non-provisional patent application claims priority under 35 U.S.C. § 119 of Korean Patent Application No. 10-2021-0126924, filed on Sep. 27, 2021, the entire contents of which are hereby incorporated by reference.

BACKGROUND

1. Technical Field

The present disclosure generally relates to an electronic device, and more particularly, to an electronic device capable of performing a wireless communication.

2. Description of the Related Art

An electronic device may include electronic modules. For example, the electronic device may be a portable terminal or a wearable device, and the electronic modules may include an antenna module, a camera module, or a battery module. Due to thinning of the portable terminal and miniaturization of the wearable device, a space for mounting the electronic modules gradually decreases. Also, as the electronic device is developed to have high functionality and high technical specifications, the number of the electronic modules contained in the electronic device is gradually increased.

SUMMARY

The present disclosure provides an electronic device minimizing a space required for mounting an antenna module supporting a wireless communication and improving reliability of the wireless communication.

An embodiment of the present disclosure provides an electronic device comprising: a display module including a display area on which an image is displayed and a non-display area adjacent to the display area; a lower module disposed below the display module to support the display module; a signal radiation pattern wherein an opening is defined in the signal radiation pattern and configured to radiate an antenna signal to an outside and disposed to overlap the non-display area in the display module; a signal transmission pattern disposed between the display module and the lower module to radiate the antenna signal toward the signal radiation pattern; and an antenna controller disposed below the lower module to provide the antenna signal to the signal transmission pattern.

In an embodiment, the signal transmission pattern may be electrically insulated from the signal radiation pattern.

In an embodiment, the signal transmission pattern may be spaced apart from the signal radiation pattern.

In an embodiment, the opening may have a rectangular shape extending along the non-display area.

In an embodiment, if a length of the rectangular shape of the opening is referred to as an opening length, the opening length may correspond to a wavelength of the antenna signal.

In an embodiment, when the wavelength of the antenna signal is $\lambda$, the opening length may be $\lambda$.

In an embodiment, when the wavelength of the antenna signal is $\lambda$, the opening length may be $\lambda/2$.

In an embodiment, the opening may include a plurality of openings, and each of the plurality of the openings may be spaced apart from each other.

In an embodiment, the plurality of openings may be spaced apart from each other along the non-display area.

In an embodiment, the display module may include: a display element layer having a light emitting element; and a circuit element layer disposed below the display element layer to drive the light emitting element. Here, the light emitting element may include: a first electrode electrically connected with the circuit element layer; a light emitting layer disposed on the first electrode; and a second electrode disposed on the light emitting layer. Also, the signal radiation pattern may include the same material as the second electrode.

In an embodiment, the non-display area may include a first non-display area and a second non-display area. Here, first non-display area may be disposed between the display area and the second non-display area, the second non-display area may be an area on which an electrode of the circuit element layer, the first electrode, and the second electrode are not disposed, and the signal radiation pattern may overlap the second non-display area.

In an embodiment, the signal radiation pattern may further include a peripheral pattern disposed adjacent to the opening, and the peripheral pattern may include a plurality of meshes.

In an embodiment, the electronic device may further include an external case configured to accommodate the display module and the lower module. The signal radiation pattern may contact the external case.

In an embodiment, the signal radiation pattern may further include a peripheral pattern adjacent to the opening. The opening may be surrounded by the peripheral pattern and the external case.

In an embodiment, the signal transmission pattern may overlap the signal radiation pattern on a plane.

In an embodiment, the signal transmission pattern may not overlap the signal radiation pattern on a plane.

In an embodiment, when the non-display area extends in a second direction, the signal transmission pattern may have a rectangular shape extending in a first direction crossing the second direction. When a length in the first direction of the signal transmission pattern is referred to as a transmission pattern length, the transmission pattern length may correspond to a length of a wavelength of the antenna signal.

In an embodiment, the signal transmission pattern may include a plurality of signal transmission patterns. The signal transmission patterns may be spaced apart from each other in the second direction.

In an embodiment, the electronic device may further include: a metal layer disposed below the lower module; and a connection electrode configured to electrically connect the signal transmission pattern and the antenna controller through a hole passing through the lower module and the metal layer. Here, the signal transmission pattern may receive the antenna signal from the antenna controller through the connection electrode.

In an embodiment, the electronic device may further include a metal layer disposed below the lower module. Here, the antenna controller may be disposed below the metal layer and electrically connected with the metal layer. Also, the signal transmission pattern may receive the antenna signal from the antenna controller through coupling with the metal layer.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
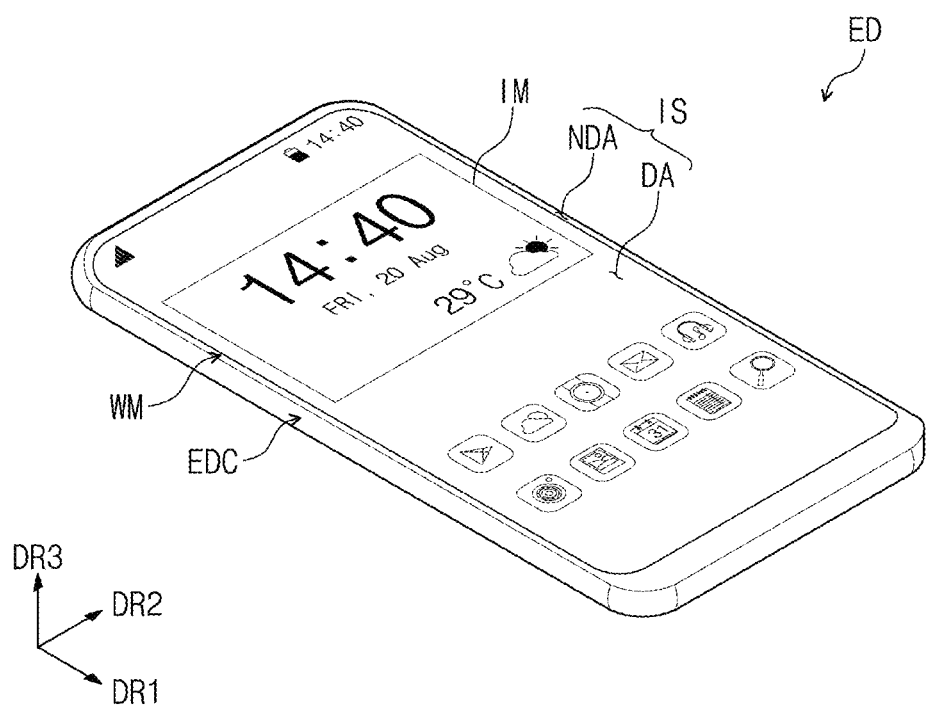
FIG. 1 is a perspective view illustrating an electronic device according to an embodiment of the present disclosure.

In this specification, it will be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration. As used herein, the term and/or includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, spatially relative terms, such as "below", "lower", "above", and "upper", may be used herein for ease of description to describe an element and/or a feature's relationship to another element(s) and/or feature(s) as illustrated in the drawings. The terms may be a relative concept and described based on directions expressed in the drawings.

The meaning of 'include' or 'comprise' specifies a property, a fixed number, a step, an operation, an element, a component or a combination thereof, but does not exclude other properties, fixed numbers, steps, operations, elements, components or combinations thereof.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Hereinafter, embodiments of the present disclosure will be described with reference to the accompanying drawings.

FIG. 1 is a perspective view illustrating an electronic device according to an embodiment of the present disclosure.

Referring to FIG. 1, an electronic device ED may be activated by an electrical signal. The electronic device ED according to an embodiment of the present disclosure may include large-sized display devices such as televisions and monitors and small and medium-sized display devices such as mobile phones, tablet computers, notebook computers, navigation units for vehicles, and game consoles. The above-described devices are suggested as merely an embodiment, and thus, the electronic device ED may include other display devices unless departing from the spirit and scope of the disclosure. The electronic device ED may have a rectangular shape having a long side in a first direction DR1 and a short side in a second direction DR2 crossing the first direction DR1. However, the embodiment of the present disclosure is not limited to the shape of the electronic device ED. For example, the electronic device ED may have various shapes. The electronic device ED may display an image IM toward a third direction DR3 on a display surface IS in parallel to each of the first direction DR1 and the second direction DR2. The display surface IS on which the image IM is displayed may correspond to a front surface of the electronic device ED.

In this embodiment, a front surface (or a top surface) and a rear surface (or a bottom surface) of each of members are defined based on a direction in which the image IM is displayed. The front surface and the rear surface may be opposite to each other in the third direction DR3, and a normal direction of each of the front surface and the rear surface may be parallel to the third direction DR3.

A spaced distance between the front surface and the rear surface in the third direction DR3 may correspond to a thickness of the electronic device ED in the third direction DR3. Here, directions indicated by the first to third directions DR1, DR2 and DR3, as relative concepts, may be converted with respect to each other.

The electronic device ED may sense an external input applied from the outside. The external input may include various types of inputs provided from the outside of the electronic device ED. The electronic device ED according to an embodiment of the present disclosure may sense a users external input applied from the outside. The user's external input may be one of various types of external inputs such as a portion of a user's body, light, heat, gaze, or pressure, or a combination thereof.

The display surface IS of the electronic device ED may be distinguished into a display area DA and a non-display area NDA. The display area DA may be an area on which the image IM is displayed. A user may recognize the image IM through the display area DA. In this embodiment, the display area DA has a rectangular shape having rounded vertices. However, this is merely illustrative, and the embodiment of the present disclosure is not limited thereto. For example, the display area DA may have various shapes.

The non-display area NDA is disposed adjacent to the display area DA. The non-display area NDA may have a predetermined color. The non-display area NDA may surround the display area DA. Thus, a shape of the display area DA may be substantially defined by the non-display area NDA. However, this is merely illustrative. For example, the non-display area NDA may be disposed adjacent to only one side of the display area DA or omitted. The electronic device ED according to an embodiment of the present disclosure may include various embodiments and is not limited to any one embodiment.

The electronic device ED includes a window WM and an external case EDC. The window WM may be made of a transparent material capable of transmitting the image IM. For example, the window may be made of glass, sapphire, or plastic. The external case EDC may be coupled with the window WM to define an appearance of the electronic device ED. The external case EDC absorbs an impact applied from the outside to the electronic device ED and prevents foreign substances/moisture from being permeated into the electronic device ED to protect components accommodated in the external case EDC. The window WM and the external case EDC will be described later with reference to FIG. 3A.

Figure 2:
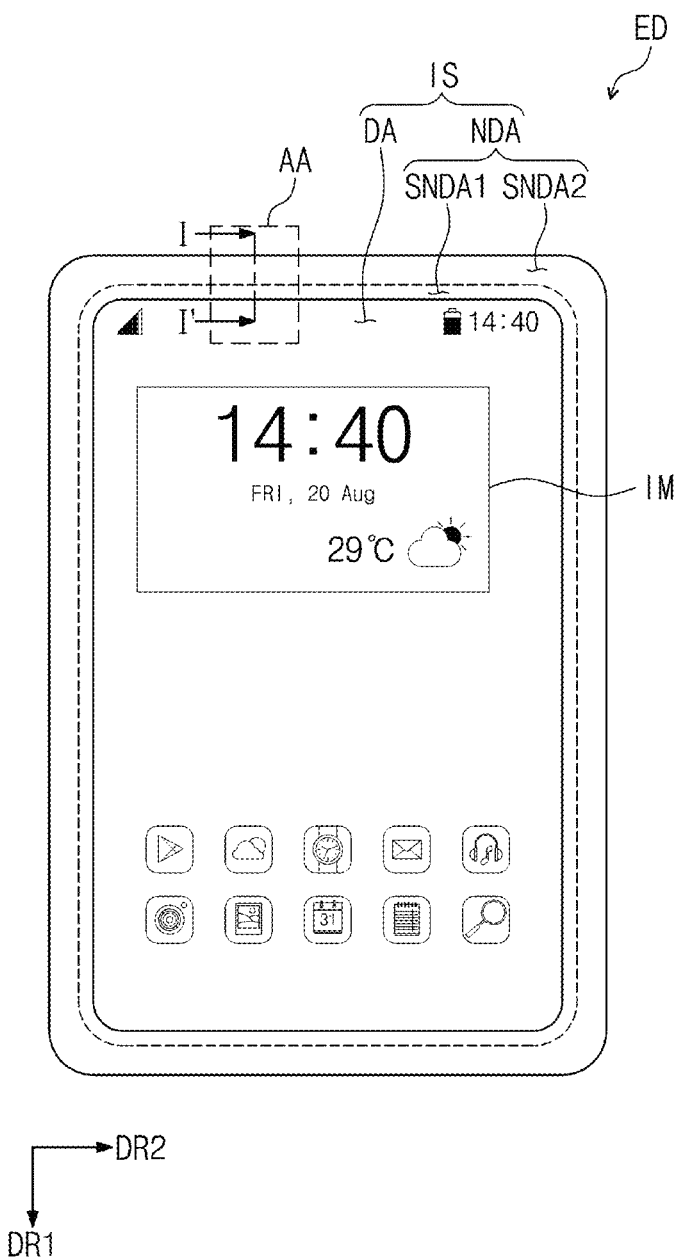
FIG. 2 is a plan view illustrating the electronic device according to an embodiment of the present disclosure.
Figure 3A:
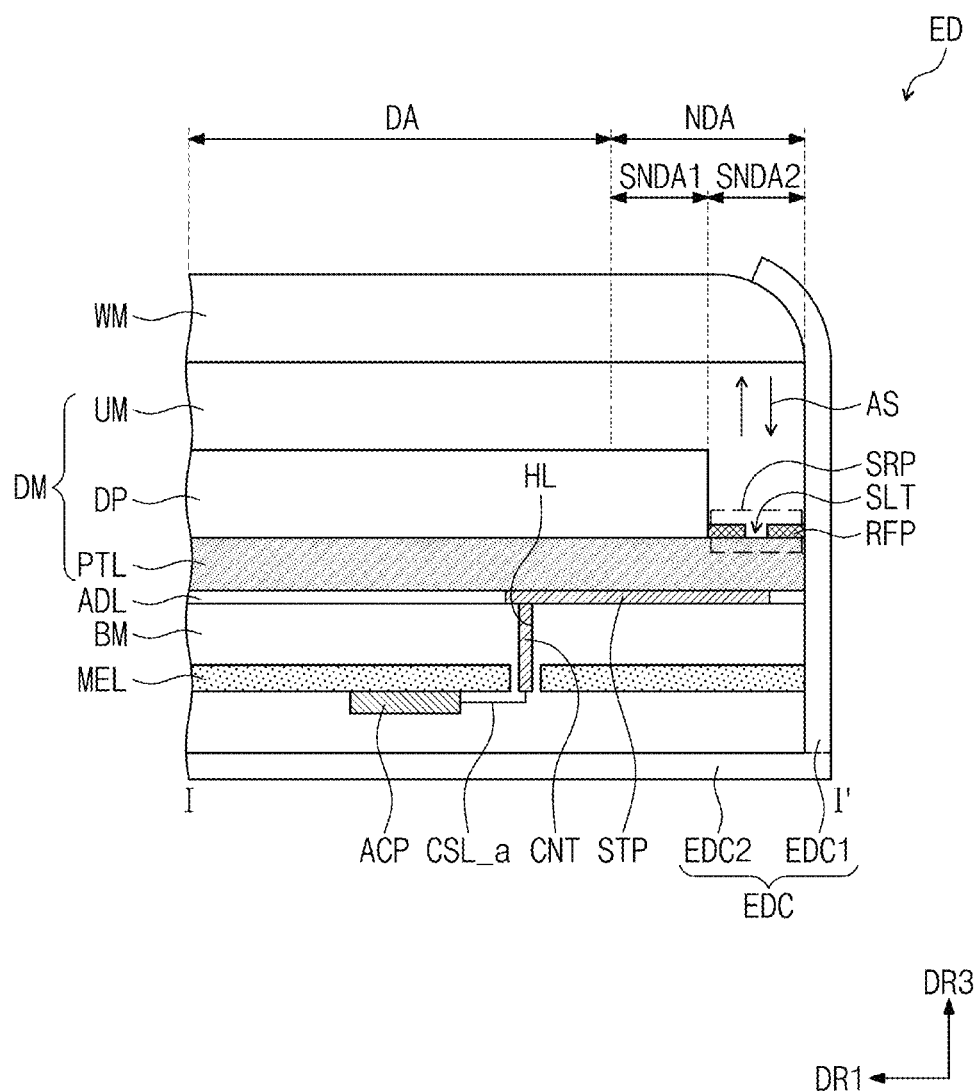
FIG. 3A is a cross-sectional view illustrating the electronic device taken along cutting line I-I' in FIG. 2.
Figure 3B:
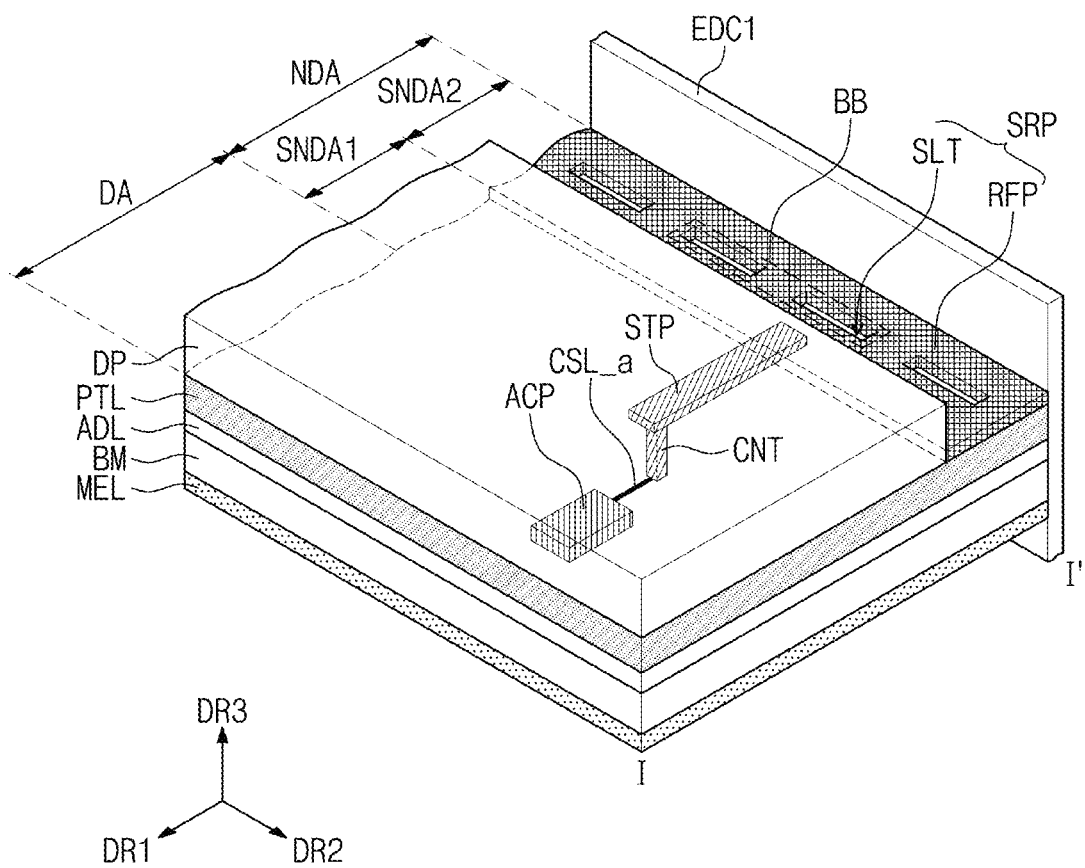
FIG. 3B is a perspective view illustrating the electronic device taken along the cutting line I-I' in FIG. 2.
Figure 3C:
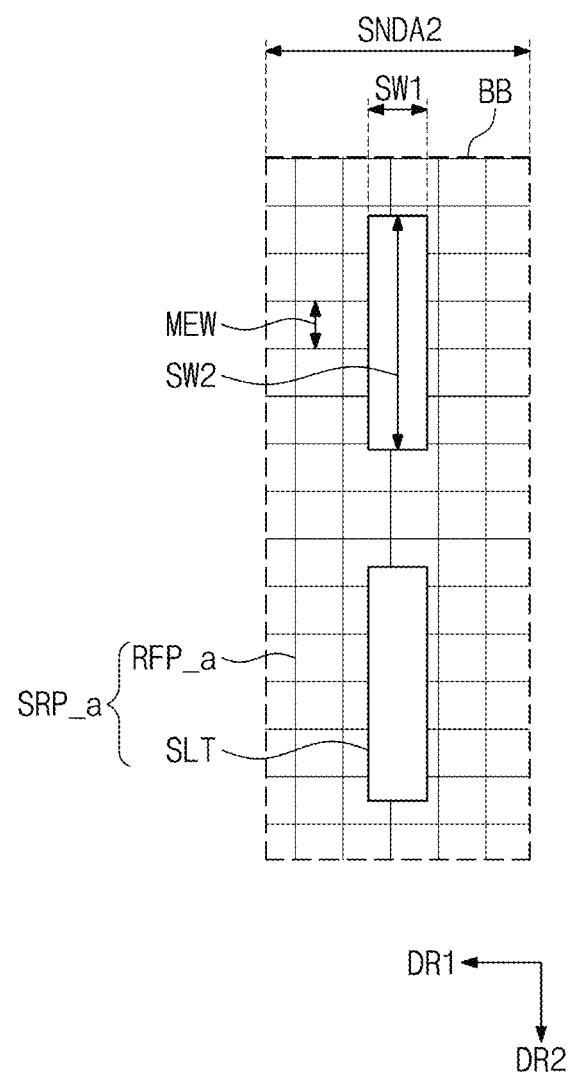
FIG. 3C is a plan view for explaining a signal radiation pattern disposed on an area BB in FIG. 3B.
Figure 4A:
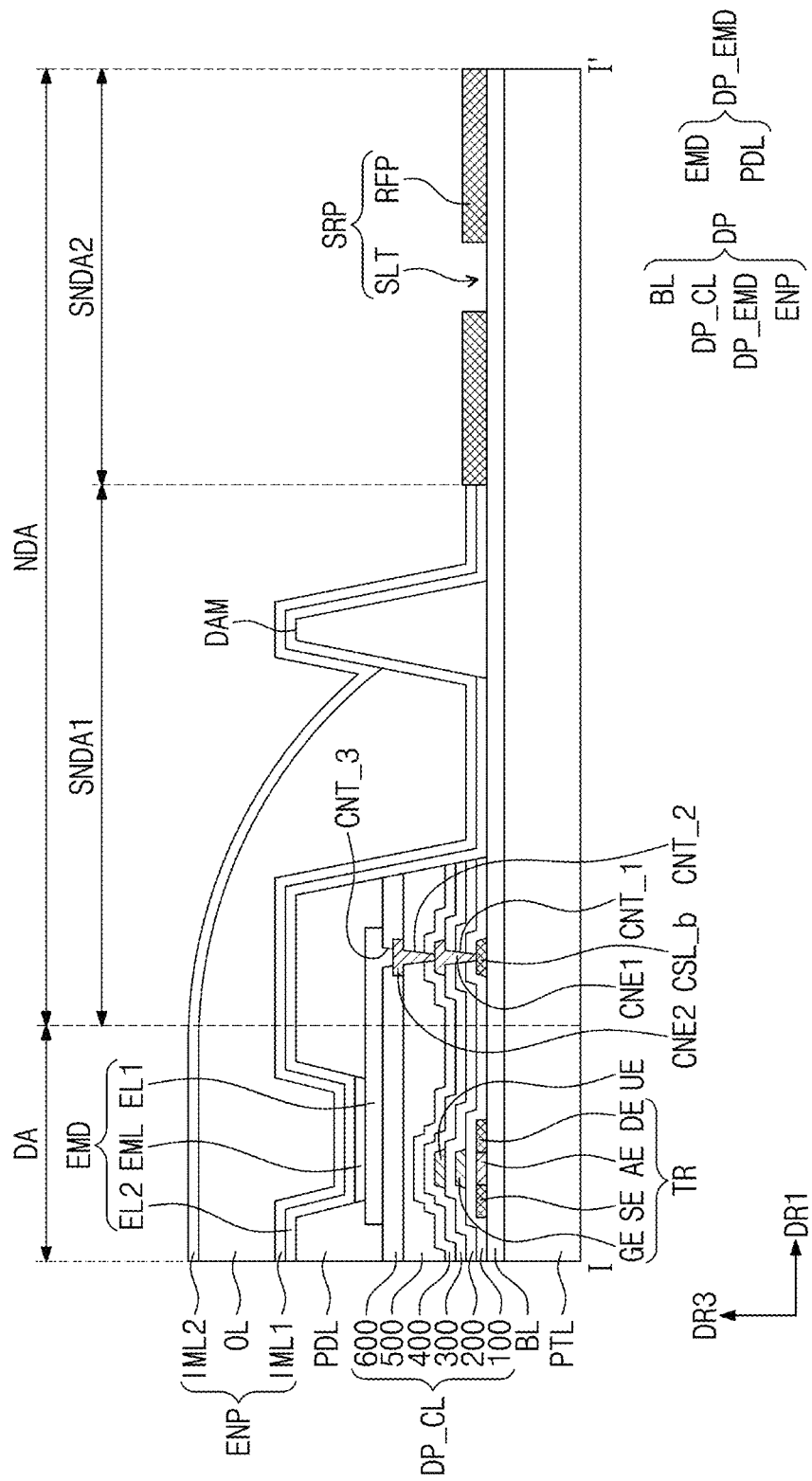
FIGS. 4A and 4B are cross-sectional views illustrating a portion of the components of a display module taken along the cutting line I-I' in FIG. 2.

FIG. 2 is a plan view illustrating the electronic device according to an embodiment of the present disclosure. FIG. 3A is a cross-sectional view taken along cutting line I-I' in FIG. 2. FIG. 3B is a cutaway perspective view illustrating a portion of components of the electronic device taken along the cutting line I-I' in FIG. 2. FIG. 3C is a plan view for explaining a signal radiation pattern disposed on an area BB in FIG. 3B. FIG. 4A is a cross-sectional view illustrating a portion of components of the display module taken along the cutting line I-I' in FIG. 2.

Referring to FIGS. 2 and 3A, the non-display area NDA includes a first non-display area SNDA1 and a second non-display area SNDA2. The first non-display area SNDA1 may be an area in which a display panel DP is disposed on a protection layer PTL. The second non-display area SNDA2 may be an area in which the display panel DP is not disposed on the protection layer PTL. In an embodiment of the present disclosure, the second non-display area SNDA2 is disposed adjacent to the first non-display area SNDA1. The second non-display area SNDA2 may be disposed at one side of the first non-display area SNDA1 or surround the first non-display area SNDA1. The first non-display area SNDA1 may be disposed between the display area DA and the second non-display area SNDA2. The first and second non-display areas SNDA1 and SNDA2 will be described later with reference to FIG. 4.

Referring to FIG. 3A, the electronic device ED includes the window WM, a display module DM, a lower module BM, a metal layer MEL, and the external case EDC.

The window WM provides the front surface of the electronic device ED. The window WM protects a top surface of the display module DM. The above-described non-display area NDA of the electronic device ED may be obtained by printing a material having a predetermined color on one area of the window WM. In an embodiment of the present disclosure, the window WM may include a bezel pattern (not shown) for defining the non-display area NDA. The bezel pattern may be a colored organic layer and provided by, e.g., a coating method. Although the window WM has a single layer in the drawing, the embodiment of the present disclosure is not limited thereto. For example, the window WM may include a plurality of layers.

The display module DM may include an upper module UM, the display panel DP, and the protection layer PTL.

In an embodiment of the present disclosure, the upper module UM may include an upper film. The upper film may include a synthetic resin film. The synthetic resin film may include polyimide, polycarbonate, polyamide, triacetylcellulose, polymethylmethacrylate, or polyethylene terephthalate. The upper film may absorb an external impact applied to a front surface of the display panel DP.

In an embodiment of the present disclosure, the upper module UM may further include an anti-reflection layer disposed below the upper film. The anti-reflection layer reduces a reflectance of external light incident from above the window WM. The anti-reflection layer according to an embodiment of the present disclosure may include a retarder and a polarizer. The retarder may be a film type or liquid crystal coating type retarder and include a $\lambda/2$ retarder and/or a $\lambda/4$ retarder. The polarizer may be also a film type or liquid crystal coating type polarizer. The film type polarizer may include a flexible synthetic resin film, and the liquid crystal coating type polarizer may include liquid crystals arranged in a predetermined arrangement. The retarder and the polarizer may be realized by one polarizing film.

In an embodiment of the present disclosure, the anti-reflection layer may include color filters. The color filters may be arranged in consideration of colors of light generated by the display panel DP. The anti-reflection layer may further include a light shielding pattern.

In an embodiment of the present disclosure, the upper module UM may further include an input sensing layer disposed below the anti-reflection layer. The input sensing layer may be disposed on the display panel DP and sense an external input. The input sensing layer may be directly disposed on the display panel DP. According to an embodiment of the present disclosure, the input sensing layer may be provided on the display panel DP through a continuous process. That is, when the input sensing layer is directly disposed on the display panel DP, an inner adhesive film is not disposed between the input sensing layer and the display panel DP. Alternatively, the inner adhesive film may be disposed between the input sensing layer and the display panel DP. In this case, the input sensing layer may be manufactured through a process separated from the display panel DP and then fixed to a top surface of the display panel DP by the inner adhesive film instead of being manufactured by the continuous process with the display panel DP.

In an embodiment of the present disclosure, the upper module UM may further include a first adhesive layer coupled with the window WM and a second adhesive layer coupled with the display panel DP.

Referring to FIGS. 3A and 4A, the display panel DP may include a base layer BL, a circuit element layer DP_CL disposed on the baser layer BL, and a display element layer DP_EMD disposed on the circuit element layer DP_CL. In an embodiment of the present disclosure, the display panel DP may be a light emitting type display panel such as an organic light emitting display panel, an inorganic light emitting display panel, or a quantum dot light emitting display panel. The organic light emitting display panel may include a display element layer containing an organic light emitting material. The inorganic light emitting display panel may include a display element layer containing an inorganic light emitting material. The quantum dot light emitting display panel may include a display element layer containing a quantum dot and a quantum rod. In an embodiment of the present disclosure, the display element layer DP_EMD may include a plurality of light emitting elements EMD. The display panel DP may display the image IM (refer to FIG. 1) based on light generated through the light emitting elements EMD.

In an embodiment of the present disclosure, the protection layer PTL may be disposed below the display panel DP. The protection layer PTL may protect a lower portion of the display panel DP. The protection layer PTL may include a flexible synthetic resin film. For example, the protection layer PTL may contain polyethylene terephthalate.

In an embodiment of the present disclosure, the display panel DP may be disposed on the protection layer PTL. The display area DA may correspond to an area, on which the light emitting elements EMD are disposed, and the image is substantially displayed, in the display panel DP. The first non-display area SNDA1 may correspond to an area on which the light emitting elements EMD are not disposed, and the image is not substantially displayed, in the display panel DP. In an embodiment of the present disclosure, the circuit element layer DP_CL may be disposed on the first non-display area SNDA1, and the display element layer DP_EMD may not be disposed on the first non-display area SNDA1. The second non-display area SNDA2 may correspond to an area on which the display panel DP is not disposed. However, in an embodiment of the present disclosure, only the base layer BL may be disposed on the second non-display area SNDA2, and the circuit element layer DP_CL and the display element layer DP_EMD may not be disposed on the second non-display area SNDA2. This embodiment will be described later with reference to FIG. 4B.

In an embodiment of the present disclosure, the lower module BM may include a barrier layer, a support layer, a heat dissipation layer, a magnetic shielding sheet, and adhesive layers. The barrier layer may be disposed below the display module DM. The barrier layer may increase a resistant force against a compressive force caused by external pressing. Thus, the barrier layer may prevent the display module DM from being deformed. The barrier layer may include a flexible plastic material such as polyimide or polyethylene terephthalate. Also, the barrier layer may be a colored film having a low light transmittance.

The support layer may be disposed below the barrier layer and support components disposed on the support layer. The support layer may have strength greater than that of the barrier layer. In an embodiment of the present disclosure, the support layer may include a non-metallic material. The support layer may include a reinforced fiber composite. The support layer may include a reinforced fiber disposed in a matrix part. The reinforced fiber may be a carbon fiber or a glass fiber. The matrix part may include a polymer resin. The matrix part may include a thermoplastic resin.

The heat dissipation layer is disposed below the support layer. The heat dissipation layer may dissipate heat generated from electronic components (not shown) disposed therebelow. The heat dissipation layer may have a structure in which an adhesive layer and a graphite layer are alternately laminated.

The magnetic shielding sheet may be disposed below the heat dissipation layer. The magnetic shielding sheet shields a magnetic field generated from electronic components disposed therebelow. The magnetic shielding sheet may prevent a magnetic field generated from the electronic components from interfering the display module DM.

The adhesive layers may couple each of the barrier layer, the support layer, the heat dissipation layer, and the magnetic shielding sheet. In an embodiment of the present disclosure, the adhesive layers may include a pressure sensitive adhesive or an optically transparent adhesive. In an embodiment of the present disclosure, some of the above-described components may be omitted. For example, the support layer or the heat dissipation layer and the adhesive layer corresponding thereto may be omitted.

In an embodiment of the present disclosure, the metal layer MEL is disposed below the lower module BM. The metal layer MEL may include copper. A reference voltage may be provided to the metal layer MEL. In an embodiment of the present disclosure, the reference voltage may be a ground voltage. Also, the metal layer MEL may provide the reference voltage to a signal transmission pattern STP.

Referring to FIGS. 3A and 3B, in an embodiment of the present disclosure, the signal transmission pattern STP may be disposed between the protection layer PTL and the lower module BM. The signal transmission pattern STP may overlap a portion of the display area DA and a portion of each of the first non-display area SNDA1 and the second non-display area SNDA2. In an embodiment of the present disclosure, an intermediate adhesive layer ADL may be further provided between the protection layer PTL and the lower module BM. In an embodiment of the present disclosure, the intermediate adhesive layer ADL may couple the protection layer PTL and the lower module BM. Although the intermediate adhesive layer ADL is not in overlap with the signal transmission pattern STP in FIG. 3A in the third direction DR3, the embodiment of the present disclosure is not limited thereto. The intermediate adhesive layer ADL may overlap the signal transmission pattern STP in the third direction DR3 to couple the signal transmission pattern STP and the protection layer PTL together. Also, in an embodiment of the present disclosure, the intermediate adhesive layer ADL may be omitted.

In an embodiment of the present disclosure, the electronic device ED may further include an antenna controller ACP. The antenna controller ACP may be disposed below the lower module BM. The antenna controller ACP may generate a radio communication signal AS transmitted to an outside through the electronic device ED, e.g., a radio frequency signal. Also, the antenna controller ACP may generate a signal for controlling an operation of the electronic device ED based on the radio communication signal AS received from the outside through the electronic device ED. Hereinafter, the radio communication signal AS is referred to as an antenna signal AS for convenience of description.

The electronic device ED may further include a connection electrode CNT and a connection signal line CSL_a. The connection signal line CSL_a may be electrically connected with the antenna controller ACP and disposed below the metal layer MEL. The connection electrode CNT may be connected with the connection signal line CSL_a and the signal transmission pattern STP through a hole HL passing through the lower module BM and the metal layer MEL. The antenna controller ACP and the signal transmission pattern STP may be electrically connected through the connection electrode CNT and the connection signal line CSL_a. The antenna controller ACP may provide the antenna signal AS to the signal transmission pattern STP through the connection electrode CNT and the connection signal line CSL_a. Although the connection electrode CNT and the connection signal line CSL_a are separate components in FIG. 3A, the embodiment of the present disclosure is not limited thereto.

For another example, the connection electrode CNT and the connection signal line CSL_a may have an integrated shape.

The metal layer MEL may serve as the ground of the signal transmission pattern STP. The lower module BM serving as an insulator is disposed between the metal layer MEL and the signal transmission pattern STP. That is, the signal transmission pattern STP may be a microstrip antenna.

The electronic device ED may further include a signal radiation pattern SRP disposed on the non-display area NDA. In an embodiment of the present disclosure, the signal radiation pattern SRP may be disposed on the second non-display area SNDA2. An opening SLT is defined in the signal radiation pattern SRP, and the signal radiation pattern SRP includes a peripheral pattern RFP surrounding the opening SLT. In an embodiment of the present disclosure, although it is not shown, the opening SLT may include a plurality of openings SLT, and the peripheral pattern RFP may include a plurality of the peripheral patterns RFP. The plurality of openings SLT and peripheral patterns RFP may be spaced apart from each other. Specifically, the openings SLT and peripheral patterns RFP may be spaced apart from each other along the second non-display area SNDA2. In FIG. 3B, the openings SLT and peripheral patterns RFP are spaced apart from each other in the second direction DR2. However, the embodiment of the present disclosure is not limited thereto. For example, the openings SLT may be spaced apart from each other in the first direction DR1 and the second direction DR2.

In an embodiment of the present disclosure, the signal radiation pattern SRP and the signal transmission pattern STP may be electrically insulated from each other. In an embodiment of the present disclosure, since the signal radiation pattern SRP is disposed on the protection layer PTL, and the signal transmission pattern STP is disposed below the protection layer PTL, the signal radiation pattern SRP and the signal transmission pattern STP are spaced apart from each other in the third direction DR3. Since the signal transmission pattern STP is disposed below the display panel DP in an embodiment of the present disclosure, a visibility of the user may not be degraded by the signal transmission pattern STP. Also, a noise generated in the signal transmission pattern STP caused by interference of the signal generated from the display panel DP may be prevented. Also, in an embodiment of the present disclosure, when compared with a case in which the signal radiation pattern SRP and the signal transmission pattern STP are disposed on the same layer, a surface area of an area required for arranging the signal radiation pattern SRP and the signal transmission pattern STP on a plane may be reduced in a case in which the signal radiation pattern SRP and the signal transmission pattern STP are disposed on different layers and overlap each other.

The signal transmission pattern STP may overlap the signal radiation pattern SRP in the third direction DR3. In an embodiment of the present disclosure, the signal transmission pattern STP may overlap a portion of the display area DA and a portion of the non-display area NDA in the third direction DR3. However, the embodiment of the present disclosure is not limited thereto. The signal transmission pattern STP may not overlap the display area DA and may overlap only a portion of the non-display area NDA.

The signal transmission pattern STP may radiate the antenna signal AS toward the signal radiation pattern SRP. The signal radiation pattern SRP formed to corresponding to a frequency of the antenna signal AS transmitted from the signal transmission pattern STP may receive the antenna signal AS from the signal transmission pattern STP. The signal radiation pattern SRP may radiate the received antenna signal AS to an outside of the electronic device ED through each of the openings SLT. Also, the signal radiation pattern SRP may receive the antenna signal AS radiated to the electronic device ED from the outside through each of the openings SLT. The received antenna signal AS may be provided to the antenna controller ACP through the signal transmission pattern STP. A frequency of the antenna signal AS and lengths of the signal transmission pattern STP and the signal radiation pattern SRP corresponding thereto will be described later with reference to FIGS. 8A and 8B.

In an embodiment of the present disclosure, the external case EDC includes a first external case EDC1 defining a side surface of the electronic device ED and a second external case EDC2 defining a bottom surface of the electronic device ED. In an embodiment of the present disclosure, the signal radiation pattern SRP may contact the first external case EDC1. When the signal radiation pattern SRP contacts the first external case EDC1, a transmission efficiency of the antenna signal AS may be increased by preventing the antenna signal AS radiated from the signal transmission pattern STP from traveling toward a side surface of the signal radiation pattern SRP. Also, the antenna signal AS radiated from the signal radiation pattern SRP may travel toward the front surface of the electronic device ED instead of traveling toward the side surface of the electronic device ED. Although the second external case EDC2 is spaced apart from the metal layer MEL and the antenna controller ACP along the third direction DR3 as shown in FIG. 3A, the second external case EDC2 may contact the metal layer MEL and the antenna controller ACP in another embodiment.

Referring to FIG. 3C, a signal radiation pattern SRP_a includes a plurality of openings SLT and a plurality of peripheral patterns RFP_a. In an embodiment of the present disclosure, each of the openings SLT may be defined by the peripheral pattern RFP_a. The peripheral pattern RFP_a may include a conductive material. In an embodiment of the present disclosure, the peripheral pattern RFP_a may be a portion of the metal pattern. The peripheral pattern RFP_a may include copper, silver, and an indium tin oxide (ITO). The peripheral pattern RFP_a may include the same material as a second electrode EL2 that will be described later.

Each of the openings SLT defined by the peripheral pattern RFP_a may have a rectangular shape having a long length in the second direction DR2 and a short length in the first direction DR1 disposed in the second non-display area SNDA2. In an embodiment of the present disclosure, each of the openings SLT may have a shape extending in the second direction DR2 in an area BB. A length in the first direction DR1 of each of the openings SLT may be defined as a first opening length SW1, and a length in the second direction DR2 of each of the openings SLT may be defined as a second opening length SW2.

Each of the peripheral patterns RFP_a may have a mesh shape. A length MEW in the second direction DR2 of each of the meshes is less than the second opening length SW2. In an embodiment of the present disclosure, the length MEW of each of the meshes may be equal to or less than the first opening length SW1. When the length MEW of each of the meshes is less than the second opening length SW2, each of the openings SLT resonates by the antenna signal AS radiated from the signal transmission pattern STP (refer to FIG. 3A), but the peripheral pattern RFP_a does not resonate by the antenna signal AS. Thus, the signal radiation pattern SRP_a may receive the antenna signal AS from the signal transmission pattern STP through the openings SLT and radiate the antenna signal AS to the outside through the openings SLT.

Figure 4B:
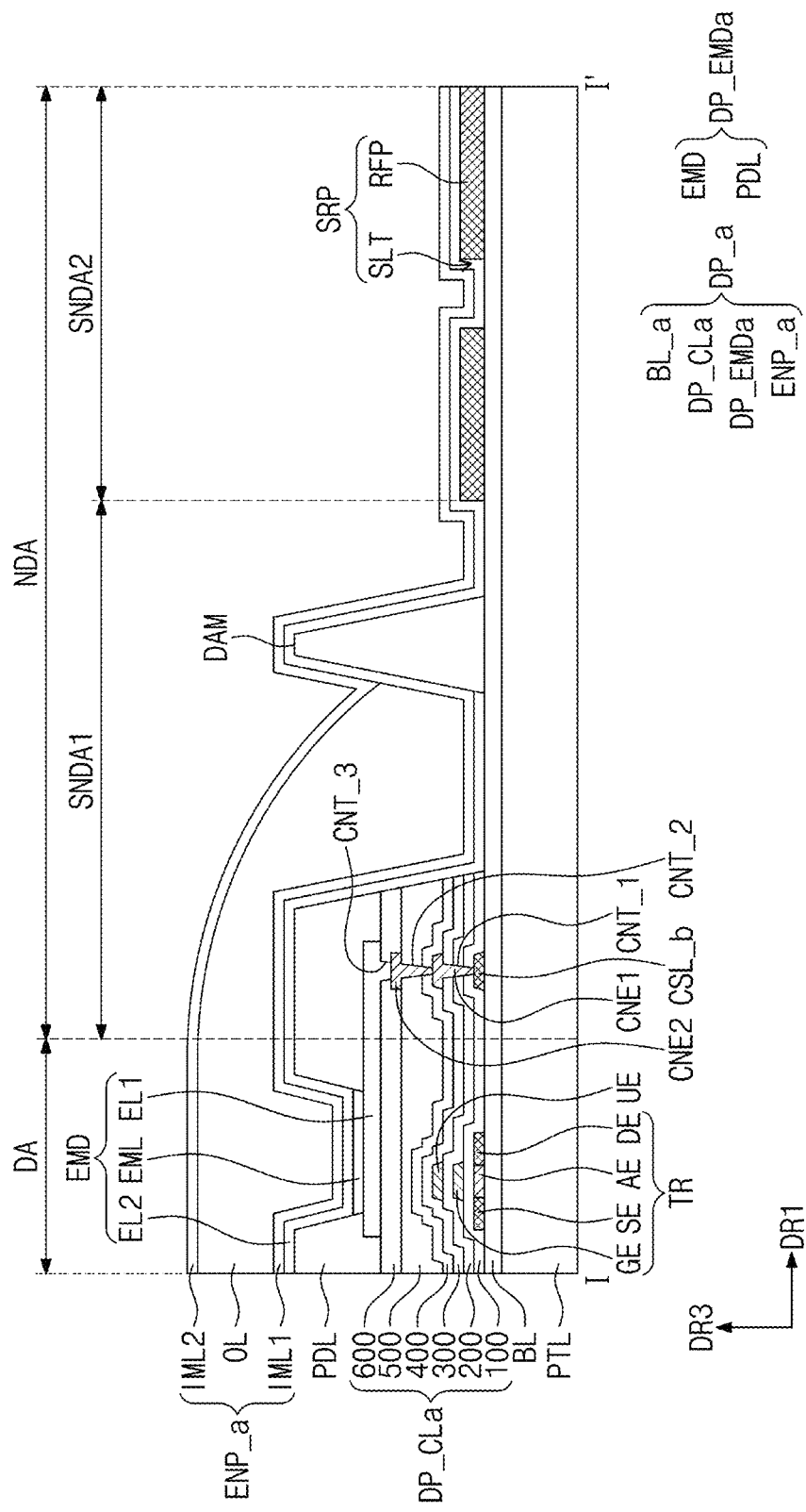

FIGS. 4A and 4B are cross-sectional views illustrating a portion of the components of the display module taken along the cutting line I-I' in FIG. 2.

In FIGS. 4A and 4B, only the display panel DP and the protection layer PTL among the components of the display module DM (refer to FIG. 3A) are illustrated for convenience of description.

Referring to FIG. 4A, the display panel DP includes a base layer BL, a circuit element layer DP_CL, a display element layer DP-EMD, and an encapsulation layer ENP.

In an embodiment of the present disclosure, the base layer BL may be disposed on a top surface of the protection layer PTL. The base layer BL may include a synthetic resin layer. The synthetic resin layer may include a thermosetting resin. The base layer BS may have a multilayer structure. For example, the base layer BL may have a three-layer structure of a synthetic resin layer, an adhesive layer, and a synthetic resin layer. Although the synthetic resin layer may be a polyimide-based resin layer, the embodiment of the present disclosure is not limited to the material of the synthetic resin layer. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. Besides, the base layer BL may include a glass substrate, a metal substrate, or an organic/inorganic composite substrate.

At least one inorganic layer may be disposed on a top surface of the base layer BL. The inorganic layer may include at least one of an aluminum oxide, a titanium oxide, a silicon oxide, a silicon oxynitride, a zirconium oxide, or a hafnium oxide. The inorganic layer may have multiple layers. The multilayered inorganic layers may include a barrier layer and/or a buffer layer.

The circuit element layer DP_CL may include a plurality of intermediate insulation layers, a semiconductor pattern, a conductive pattern, and a signal line. The intermediate insulation layer, the semiconductor layer, and the conductive layer may be provided by a method such as coating and deposition. Thereafter, the intermediate insulation layer, the semiconductor layer, and the conductive layer may be selectively patterned by a photolithography method. The semiconductor, the conductive pattern, and the signal line of the circuit element layer DP_CL may be provided by the above-described method.

The circuit element layer DP_CL may include a first intermediate insulation layer 100, a second intermediate insulation layer 200, a third intermediate insulation layer 300, a fourth intermediate insulation layer 400, a fifth intermediate insulation layer 500, and a sixth intermediate insulation layer 600.

The semiconductor pattern may be disposed on the base layer BL. The semiconductor pattern may include polysilicon. However, the embodiment of the present disclosure is not limited thereto. For example, the semiconductor pattern may include amorphous silicon or a metal oxide. Also, although not shown, the circuit element layer DP_CL may further include a buffer layer for improving a coupling force between the base layer BL and the semiconductor pattern, and the semiconductor pattern may be disposed on the buffer layer.

FIG. 4A merely illustrates a portion of the semiconductor pattern. The semiconductor pattern may be further disposed on another area of a pixel on a plane. The semiconductor pattern may be arranged over the pixels according to a particular rule. The semiconductor pattern may have an electrical property that is varied according to whether doped or not. The semiconductor pattern may include a first semiconductor area having high conductivity and a second semiconductor area having low conductivity. The first semiconductor area may be doped with an n-type dopant or a p-type dopant. A p-type transistor includes a doped area that is doped with the p-type dopant. The second semiconductor area may be doped with a concentration less than that of the first semiconductor area.

The first semiconductor area has conductivity greater than that of the second semiconductor area and substantially serves as an electrode or a signal line. The second semiconductor area corresponds to a channel (or active) of the transistor. In other words, one portion of the semiconductor pattern may be a channel region of the transistor, another portion may be a source region or a drain region of the transistor, and another portion may be a connection electrode or a connection signal line.

As illustrated in FIG. 4A, a source region SE, a channel region AE, and a drain region DE of a transistor TR are provide from the semiconductor pattern. The source region SE and the drain region DE may extend in opposite directions from the channel region AE on a cross-section. In FIG. 4A, a portion of a connection signal line CSL_b provided from the semiconductor pattern is illustrated. Although not separately shown, the connection signal line CSL_b may be electrically connected to the drain region DE of the transistor TR on the plane.

The first intermediate insulation layer 100 overlaps the plurality of pixels in common and covers the semiconductor pattern. The first intermediate insulation layer 100 may be an inorganic layer and/or an organic layer and have a single-layer or multilayer structure. The first intermediate insulation layer 100 may include at least one of an aluminum oxide, a titanium oxide, a silicon oxide, a silicon oxynitride, a zirconium oxide, or a hafnium oxide. In this embodiment, the first intermediate insulation layer 100 may be a single-layered silicon oxide layer. Each of the second to sixth intermediate insulation layers 200, 300, 400, 500, and 600 may be an inorganic layer and/or an organic layer and have a single-layer or multilayer structure in addition to the first intermediate insulation layer 100. The inorganic layer may include at least one of the above-described materials.

A gate GE of the transistor TR is disposed on the first intermediate insulation layer 100. The gate GE may be a portion of the metal pattern. The gate GE may overlap the channel region AE. The gate GE may serve as a mask in a process of doping the semiconductor pattern.

The second intermediate insulation layer 200 covering the gate GE is disposed on the first intermediate insulation layer 100. The second intermediate insulation layer 200 may overlap the pixels in common. The second intermediate insulation layer 200 may be an inorganic layer and/or an organic layer and have a single-layer or multilayer structure. In this embodiment, the second intermediate insulation layer 200 may be a single-layered silicon oxide layer.

An upper electrode UE is disposed on the second intermediate insulation layer 200. The upper electrode UE may overlap the gate GE. The upper electrode UE may be a portion of the metal pattern. One portion of the gate GE and the upper electrode UE overlapping the one portion may define a capacitor. In an embodiment of the present disclosure, the upper electrode UE may be omitted.

The third intermediate insulation layer 300 covering the upper electrode UE is disposed on the second intermediate insulation layer 200. The third intermediate insulation layer 300 may overlap the pixels in common. The third intermediate insulation layer 300 may be an inorganic layer and/or an organic layer and have a single-layer or multilayer structure. In this embodiment, the third intermediate insulation layer 300 may be a single-layered silicon oxide layer.

A first connection electrode CNE1 may be disposed on the third intermediate insulation layer 300. The first connection electrode CNE1 may be connected to the connection signal line CSL_b through a first contact hole CNT-1 passing through the first to third intermediate insulation layers 100, 200, and 300.

The fourth intermediate insulation layer 400 may be disposed on the third intermediate insulation layer 300. The fourth intermediate insulation layer 400 may be a single-layered silicon oxide layer.

The fifth intermediate insulation layer 500 is disposed on the fourth intermediate insulation layer 400. The fifth intermediate insulation layer 500 may be an organic layer. A second connection electrode CNE2 may be disposed on the fifth intermediate insulation layer 500. The second connection electrode CNE2 may be connected to the first connection electrode CNE1 through a second contact hole CNT-2 passing through the fourth and fifth intermediate insulation layer 400 and 500.

The sixth intermediate insulation layer 600 covering the second connection electrode CNE2 is disposed on the fifth intermediate insulation layer 500. The sixth intermediate insulation layer 600 may be an organic layer.

The display element layer DP_EMD may be provided on the circuit element layer DP_CL. In an embodiment of the present disclosure, the display element layer DP_EMD may include the light emitting element EMD and a pixel defining layer PDL. In an embodiment of the present disclosure, an area on which the light emitting element EMD is disposed, and the image is substantially displayed may be referred to as the display area DA.

The light emitting element EMD may include a first electrode EL1 disposed on the circuit element layer DP_CL, a light emitting layer EML disposed on the first electrode EL1, and a second electrode EL2 disposed on the light emitting layer EML.

The first electrode EL1 is disposed on the sixth intermediate insulation layer 600. The first electrode EL1 is connected to the second connection electrode CNE2 through a third contact hole CNT-3 passing through the sixth intermediate insulation layer 600.

The pixel defining layer PDL may be disposed on the sixth intermediate insulation layer 600 to cover a portion of the first electrode EL1. A pixel opening is defined in the pixel defining layer PDL. The pixel opening exposes at least a portion of the first electrode EL1.

The light emitting layer EML is disposed on the first electrode EL1. The light emitting layer EML may be disposed on an area corresponding to the pixel opening. That is, the light emitting layer EML may be separately provided on each of the pixels. The light emitting layer EML may include a fluorescent material or a light emitting material containing a phosphorus material. The light emitting material may contain an organic light emitting material or an inorganic light emitting material. However, the embodiment of the present disclosure is not limited thereto.

The second electrode EL2 is disposed on the light emitting layer EML. The second electrode EL2 may be provided in the form of one common electrode and disposed on the plurality of pixels in common.

In an embodiment of the present disclosure, the light emitting element EMD may further include a hole control layer and an electron control layer. The hole control layer may be disposed between the first electrode EL1 and the light emitting layer EML and further include a hole injection layer. The electron control layer may be disposed between the light emitting layer EML and the second electrode EL2 and further include an electron injection layer.

The encapsulation layer ENP may be disposed on the display element layer DP-EMD. That is, the encapsulation layer ENP may be disposed on the second electrode EL2.

The encapsulation layer ENP is disposed on the plurality of pixels in common. In this embodiment, the encapsulation layer ENP may directly cover the second electrode EL2. In an embodiment of the present disclosure, a capping layer covering the second electrode EL2 may be further disposed between the encapsulation layer ENP and the second electrode EL2. Here, the encapsulation layer ENP may directly cover the capping layer.

The encapsulation layer ENP may include a first inorganic layer IML1, an organic layer OL, and a second inorganic layer IML2. The first inorganic layer IML1 and the second inorganic layer IML2 protect the light emitting element EMD from moisture and oxygen, and the organic layer OL protects the light emitting element EMD from foreign substances such as dust particles. Each of the first inorganic layer IML1 and the second inorganic layer IML2 may include a silicon nitride layer, a silicon oxynitride layer, a silicon oxide layer, a titanium oxide layer, or an aluminum oxide layer. Although the organic layer OL may include an acrylic-based organic layer, the embodiment of the present disclosure is not limited thereto.

The display panel DP may further include a dam layer DAM disposed on the base layer BL in the first non-display area SNDA1. The dam layer DAM may be referred to as a protruding part in the second direction DR2. The dam layer DAM may have a laminated structure including a plurality of insulation layers or a single-layer structure. The dam layer DAM may define an area in which the second electrode EL2 and the organic layer OL are disposed. The dam layer DAM may prevent the second electrode EL2 and the organic layer OL from being deposited over the dam layer DAM. In an embodiment of the present disclosure, the first non-display area SNDA1 may be an area on which the light emitting element EMD is not disposed, and the image IM (refer to FIG. 1) is not substantially displayed, and the second electrode EL2 may extend from the display area DA in the first direction DR1 and be disposed on the first non-display area SNDA1.

The first inorganic layer IML1 may be disposed on the light emitting element EMD. The organic layer OL is disposed on the first inorganic layer IML1. The second inorganic layer IML2 may be disposed on the organic layer OL. The organic layer OL may be sealed by the dam layer DAM and the first and second inorganic layers IML1 and IML2 disposed on the dam layer DAM. Thus, the light emitting element EMD may be prevented from being damaged as external moisture and oxygen are introduced to the display panel DP.

In an embodiment of the present disclosure, the display panel DP may not be disposed on a portion of the protection layer PTL. An area corresponding to the portion of the protection layer PTL, in which the display panel DP is not disposed, may be defined as the second non-display area SNDA2.

The signal radiation pattern SRP may be disposed on the protection layer PTL in the second non-display area SNDA2. Specifically, the peripheral pattern RFP may be disposed on the protection layer PTL, and each of the openings SLT may be defined by the peripheral pattern RFP. In an embodiment of the present disclosure, the signal radiation pattern SRP may not overlap the display panel DP. In an embodiment of the present disclosure, since the signal radiation pattern SRP is not in overlap with the display panel DP, a noise caused by interference of a signal generated from the display panel DP may not be generated in the antenna signal AS (refer to FIG. 3A) radiated from the signal radiation pattern SRP.

When FIG. 4B is described, the same components as in FIG. 4A will be designated by the same reference symbols, and a description thereof will be omitted.

Referring to FIG. 4B, the base layer BL, the first inorganic layer IML1, and the second inorganic layer IML2 are disposed on the protection layer PTL in the non-display area NDA. In this case, an area in which the signal radiation pattern SRP is disposed on the base layer BL may be defined as the second non-display area SNDA2. In an embodiment of the present disclosure, the electrodes of the circuit element layer DP_CLa and the first electrode EL1 and the second electrode EL2 of the display element layer DP-EMDa are not disposed on the second non-display area SNDA2.

The first and second inorganic layers IML1 and IML2 may cover the signal radiation pattern SRP. The first and second inorganic layers IML1 and IML2 may protect the signal radiation pattern SRP from external moisture and oxygen.

The signal radiation pattern SRP may include the same material as one of the first electrode EL1 and the second electrode EL2. The signal radiation pattern SRP may be provided on the second non-display area SNDA2 of the base layer BL2 through a process of providing the first electrode EL1 or the second electrode EL2. Since a separate process for providing the signal radiation pattern SRP is not required when the signal radiation pattern SRP is provided through the process of providing the first electrode EL1 or the second electrode EL2, the process may be simplified.

Figure 5A:
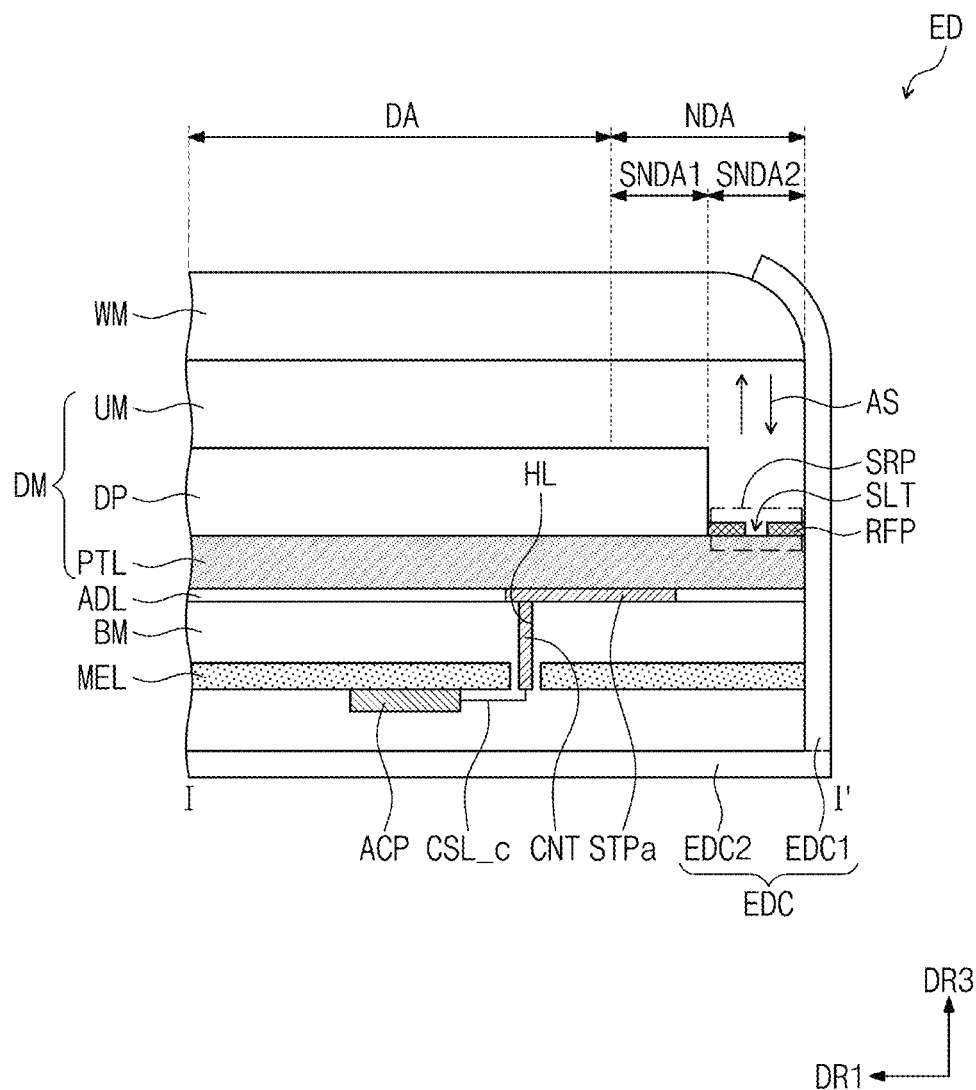
FIG. 5A is a cross-sectional view illustrating the electronic device taken along the cutting line I-I' in FIG. 2.
Figure 5B:
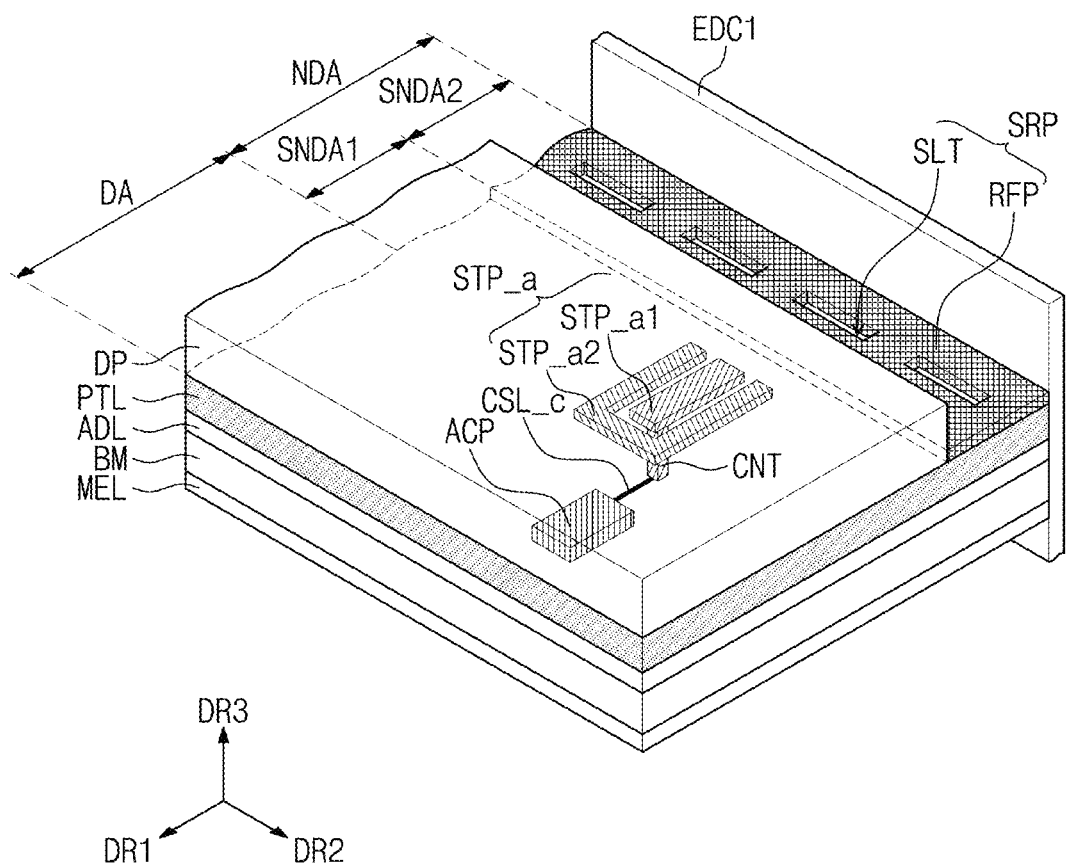
FIG. 5B is a cutaway perspective view illustrating the electronic device taken along the cutting line I-I' in FIG. 2.

FIG. 5A is a cross-sectional view illustrating the electronic device taken along the cutting line I-I' in FIG. 2. FIG. 5B is a perspective view illustrating the electronic device taken along the cutting line I-I' in FIG. 2. Hereinafter, the same components as those described with reference to FIGS. 3A and 3B are designated by the same reference symbols, and a description thereof will be omitted.

Referring to FIGS. 5A and 5B, the signal transmission pattern STP_a may overlap a portion of the display area DA and a portion of the first non-display area SNDA1 in the third direction DR3. The signal transmission pattern STP_a may not overlap the signal radiation pattern SRP in the third direction DR3. A length of the signal transmission pattern STP_a along the first direction DR1 is determined in correspondence to the frequency of the antenna signal AS. That is, the length of the signal transmission pattern STP_a may be decreased as the frequency of the antenna signal AS is increased.

In an embodiment of the present disclosure, the signal transmission pattern STP_a may include a first transmission pattern STP_a1 and a second transmission pattern STP_a2. The first transmission pattern STP_a1 may be electrically connected with the antenna controller ACP through a connection electrode CNT and a connection signal line CSL_c. The second transmission pattern STP_a2 may be an electrode that serves as the ground of the first transmission pattern STP_a1. That is, the signal transmission pattern STP_a may be a coplanar waveguide antenna to which a current is supplied for radiating the antenna signal AS on the same plane through the first transmission pattern STP_a1 and the second transmission pattern STP_a2. The signal transmission pattern STP_a in FIG. 5B may be resonated with respect to the antenna signal AS having a relatively wider bandwidth than the signal transmission pattern STP in FIG. 3B to radiate the antenna signal AS.

Figure 6:
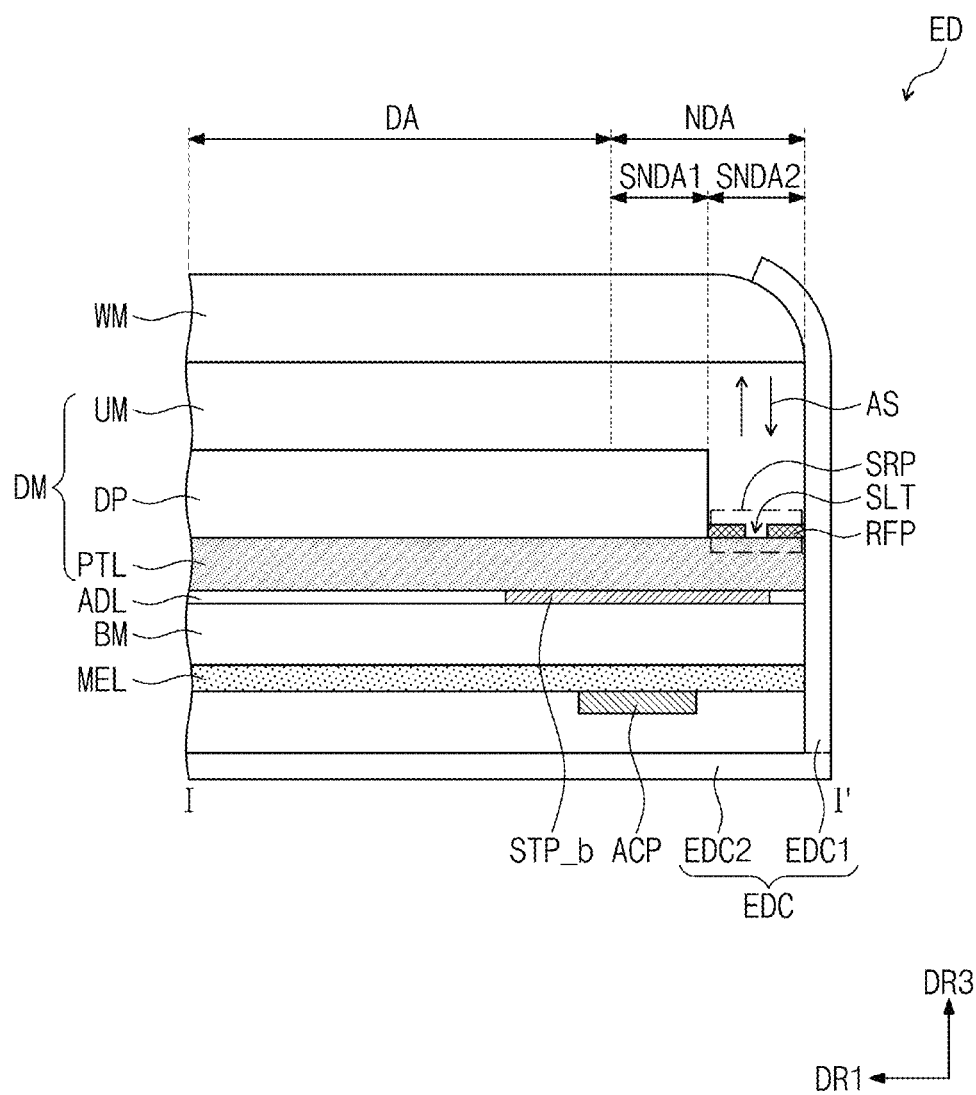
FIG. 6 is a cross-sectional view illustrating the electronic device taken along cutting line I-I' in FIG. 2.

FIG. 6 is a cross-sectional view illustrating the electronic device taken along the cutting line I-I' in FIG. 2. Hereinafter, the same components as those described with reference to FIGS. 3A and 5A are designated by the same reference symbols, and a description thereof will be omitted.

Referring to FIG. 6, the antenna controller ACP may be disposed below the metal layer MEL and electrically connected with the metal layer MEL. The antenna controller ACP may provide the antenna signal AS to the metal layer MEL. In an embodiment of the present disclosure, a capacitor including a signal transmission pattern STP_b disposed on the lower module BM and the metal layer MEL disposed below the lower module BM. When the antenna signal AS is provided to the metal layer MEL by the capacitor, the antenna signal AS may be provided to the signal transmission pattern STP_b through coupling with the metal layer MEL.

Figure 7:
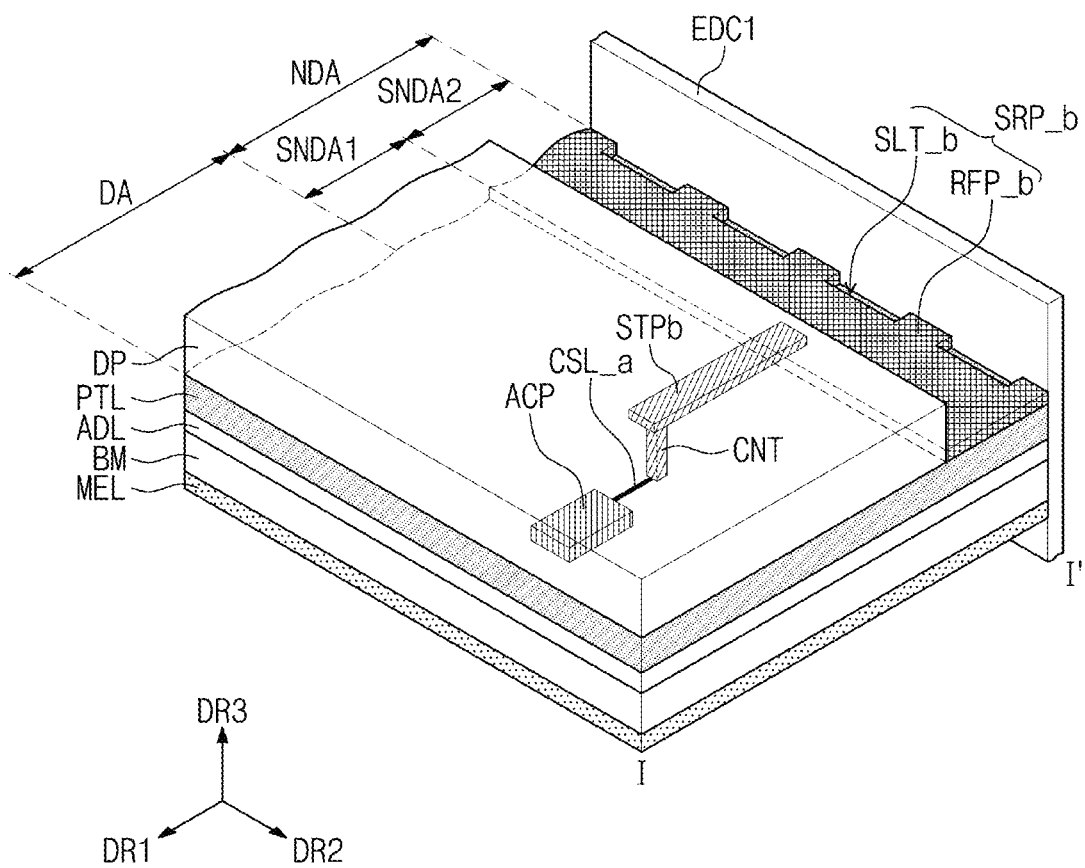
FIG. 7 is a cutaway perspective view illustrating the electronic device taken along cutting line I-I' in FIG. 2.

FIG. 7 is a cutaway perspective view illustrating the electronic device taken along the cutting line I-I' in FIG. 2. Hereinafter, the same components as those described with reference to FIGS. 3B and 5B are designated by the same reference symbols, and a description thereof will be omitted.

Referring to FIG. 7, a signal radiation pattern SRP_b includes a plurality of openings SLT_b and a peripheral pattern RFP_b disposed adjacent to the openings SLT_b. In an embodiment of the present disclosure, each of the openings SLT_b contacts the second external case EDC2. Each of the openings SLT_b may be surrounded by the second external case EDC2 and the peripheral pattern RFP_b. Each of the openings SLT_b may have a shape defied by the second external case EDC2 and the peripheral pattern RFP_b. Although the openings SLT_b are spaced apart from each other in the second direction DR2 in FIG. 7, the signal radiation pattern SRP_b may further include openings spaced apart from the openings SLT_b in the first direction DR1.

Figure 8A:
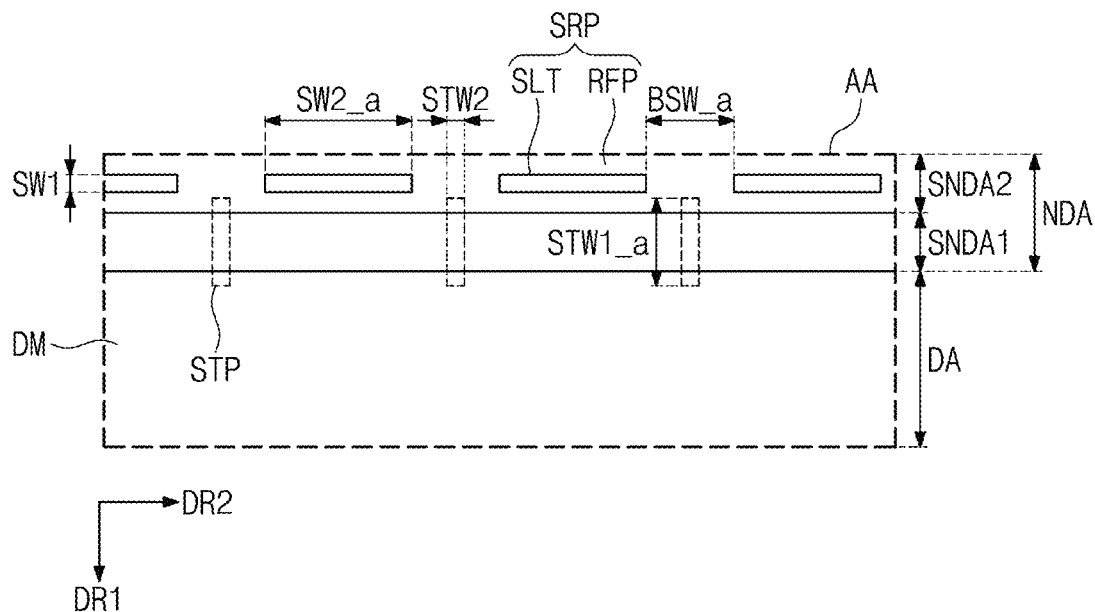
FIGS. 8A and 8B are plan views illustrating the electronic device in an area AA of FIG. 2.
Figure 8B:
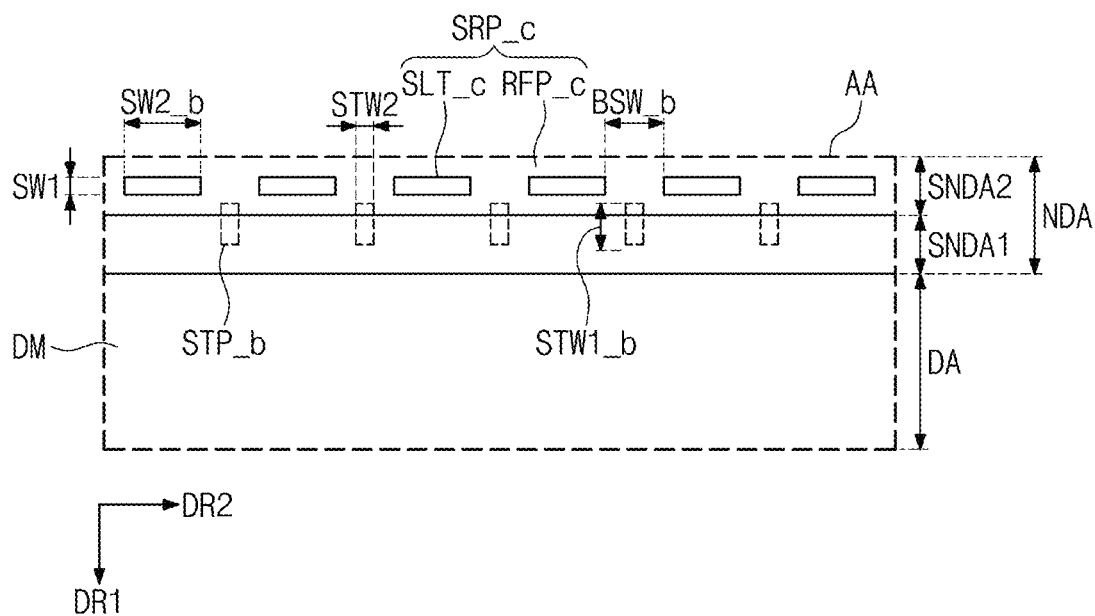

FIGS. 8A and 8B are plan views illustrating the electronic device in the area AA of FIG. 2.

Referring to FIG. 8A, when the signal radiation pattern SRP extends in the second direction DR2, the signal transmission pattern STP may have a shape extending in a direction crossing the second direction DR2. In an embodiment of the present disclosure, the signal transmission pattern STP may extend in the first direction DR1.

In an embodiment of the present disclosure, the signal transmission pattern STP may include a plurality of signal transmission patterns STP. The signal transmission patterns STP may be spaced apart from each other. In an embodiment of the present disclosure, the signal transmission patterns STP may be spaced apart from each other in the second direction DR2. Each of the signal transmission patterns STP radiates the antenna signal AS (refer to FIG. 3A) toward the signal radiation pattern SRP.

A length in the first direction DR1 of each of the signal transmission patterns STP is defined as a first length STW1_a, and a length in the second direction DR2 of each of the signal transmission patterns STP is defined as a second length STW2. The first length STW1_a is referred to as a transmission pattern length STW1_a. The transmission pattern length STW1_a corresponds to a length of a wavelength according to the frequency of the antenna signal AS. In an embodiment of the present disclosure, when the length of the wavelength of the antenna signal AS is $\lambda$, the transmission pattern length STW1_a may be $\lambda/2$. Through this, the signal transmission pattern STP may be resonated with the antenna signal AS received from the antenna controller ACP (refer to FIG. 3A) to radiate the antenna signal AS. Although each of the signal transmission patterns STP is not in overlap with the display area DA, the first non-display area SNDA1, and the second non-display area SNDA2 in FIG. 8A, the embodiment of the present disclosure is not limited thereto. Each of the signal transmission patterns STP may overlap one of the display area DA, the first non-display area SNDA1, and the second non-display area SNDA2 according to the frequency of the antenna signal AS.

The signal radiation pattern SRP includes a plurality of openings SLT each having a shape extending lengthily along the second non-display area SNDA2 and a peripheral pattern RFP disposed adjacent to the openings SLT. The signal radiation pattern SRP may extend lengthily in the second direction DR2 with reference to FIG. 8A. However, the embodiment of the present disclosure is not limited thereto. For example, when the second non-display area SNDA2 is parallel to the first direction DR1, the signal radiation pattern SRP may extend lengthily in the first direction DR1.

In an embodiment of the present disclosure, a length in the first direction DR1 of each of the openings SLT may be defined as a third length SW1, and a length in the second direction DR2 of each of the openings SLT may be defined as a fourth length SW2_a. The fourth length SW2_a is referred to as an opening length SW2_a. The opening length SW2_a corresponds to a length of a wavelength according to the frequency of the antenna signal AS. In an embodiment of the present disclosure, when the length of the wavelength of the antenna signal AS is $\lambda$, the opening length SW2_a may be $\lambda$. Through this, the signal radiation pattern SRP may be resonated with the antenna signal AS radiated from the signal transmission pattern STP to receive the antenna signal AS and radiate the received antenna signal AS to the outside. In an embodiment of the present disclosure, the signal radiation pattern SRP may include a plurality of signal radiation patterns SRP.

Each of the signal radiation patterns SRP may be spaced apart from each other in the second direction DR2. A distance between two adjacent signal radiation patterns SRP may be referred to as a radiation distance BSW_a. In an embodiment of the present disclosure, the radiation distance BSW_a may be $\lambda/2$.

Referring to FIG. 8B, a transmission pattern length STW1_b and an opening length SW2_b may be different to obtain a broadband characteristic and impedance matching between a signal radiation patterns SRP_c and a signal transmission pattern STP_b. In an embodiment of the present disclosure, when the length of the wavelength of the antenna signal AS is $\lambda$, the opening length SW2_b may be $\lambda/2$. Also, when the length of the wavelength of the antenna signal AS is $\lambda$, the transmission pattern length STW1_b may be $\lambda/4$. In an embodiment of the present disclosure, when the opening length SW2_b is $\lambda/2$, a radiation distance BSW_b may be $\lambda/4$. However, the embodiment of the present disclosure is not limited to the radiation distance BSW_b. For example, the radiation distance BSW_b may have various lengths.

Although the opening length SW2_a and SW2_b is $\lambda$ or $\lambda/2$, and the transmission pattern length STW1_a and STW1_b is $\lambda/2$ or $\lambda/4$ in FIGS. 8A and 8B, the embodiment of the present disclosure is not limited thereto. The opening length SW2_a and SW2_b and the transmission pattern length STW1_a and STW1_b may be slightly changed in correspondence to a gain of the antenna signal AS radiated from the signal radiation pattern SRP or impedance matching between the signal radiation patterns SRP and the signal transmission pattern STP. A detailed description thereof will be described later in FIGS. 9A and 9B.

Figure 9A:
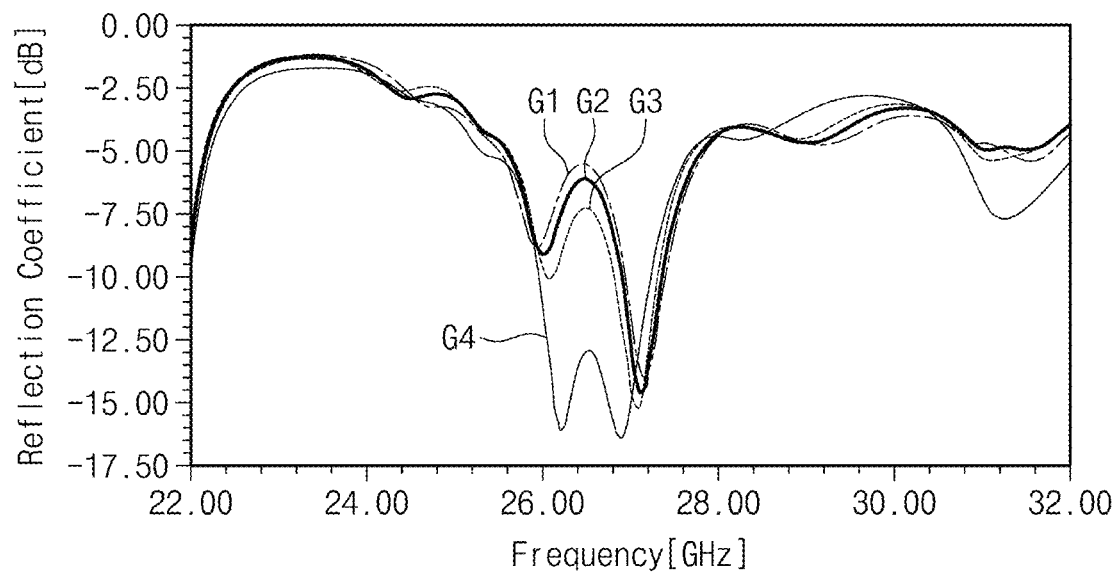
FIG. 9A is a graph for explaining a reflection coefficient of an antenna signal according to an embodiment of the present disclosure.
Figure 9B:
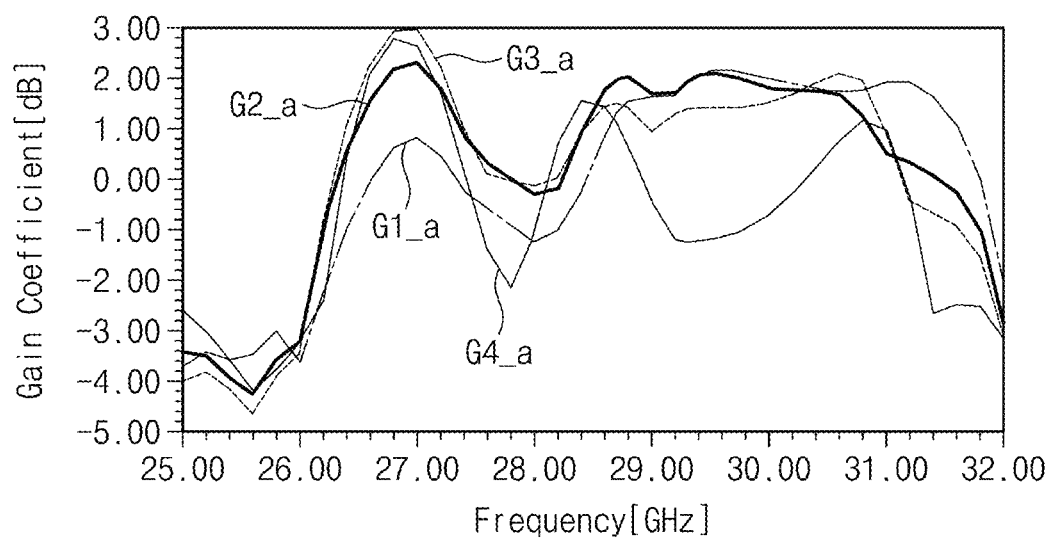
FIG. 9B is a graph for explaining a gain coefficient of the antenna signal according to an embodiment of the present disclosure.
Figure 10:
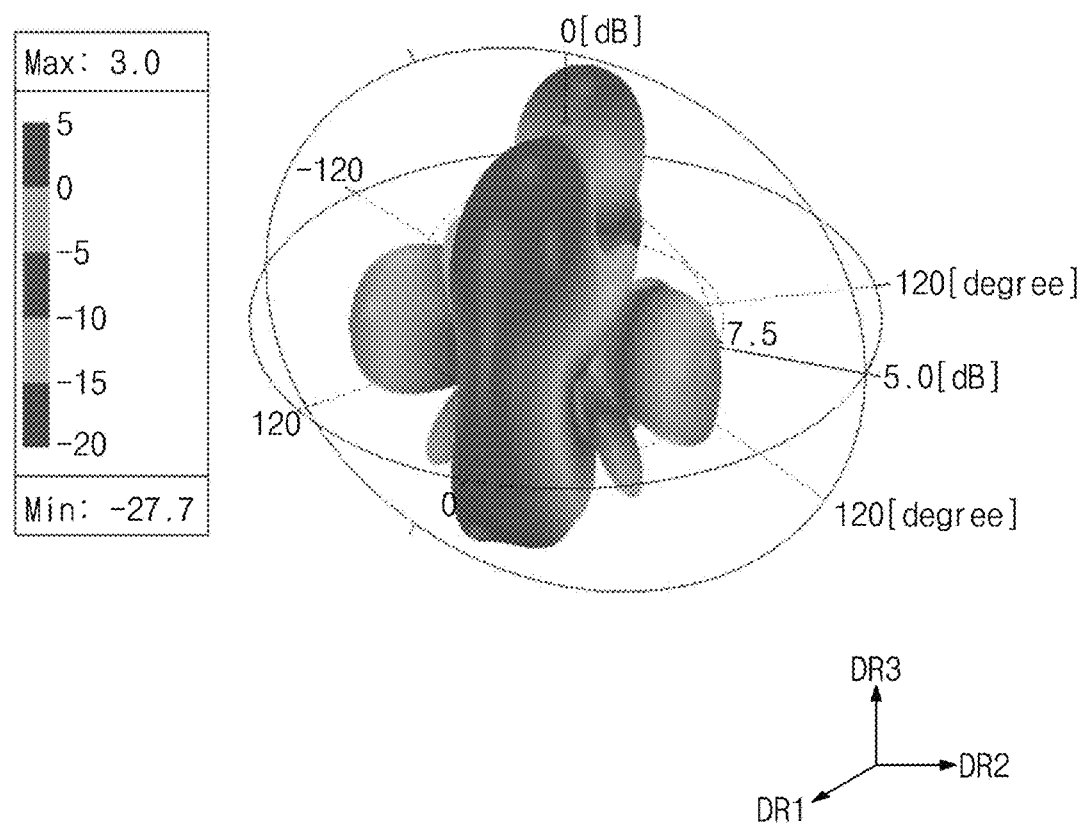
FIG. 10 is a graph representing a radiation pattern of the antenna signal according to an embodiment of the present disclosure.

FIG. 9A is a graph for explaining a reflection coefficient of the antenna signal according to an embodiment of the present disclosure. FIG. 9B is a graph for explaining a gain coefficient of the antenna signal according to an embodiment of the present disclosure. FIG. 10 is a graph representing a radiation pattern of the antenna signal according to an embodiment of the present disclosure.

Referring to FIGS. 8B and 9A, a radiation coefficient in a signal radiation pattern SRP_c for each frequency of the antenna signal AS according to a variation of the fourth length SW2_b when each of the openings SLT_c has the constant third length SW1 is illustrated.

The fourth length SW2_b may be varied according to the third length SW1. In an embodiment of the present disclosure, the reflection coefficient of the antenna signal AS is measured when the third length SW1 is fixed to about 3.3 mm, and the fourth length SW2_b is varied. A first graph G1 represents the reflection coefficient in the signal radiation pattern SRP_c for each frequency of the antenna signal AS when the fourth length SW2_b is about 3 mm. A second graph G2 represents the reflection coefficient in the signal radiation pattern SRP_c for each frequency of the antenna signal AS when the fourth length SW2_b is about 3.1 mm. A third graph G3 represents the reflection coefficient in the signal radiation pattern SRP_c for each frequency of the antenna signal AS when the fourth length SW2_b is about 3.2 mm. A fourth graph G4 represents the reflection coefficient in the signal radiation pattern SRP_c for each frequency of the antenna signal AS when the fourth length SW2_b is about 3.3 mm.

In general, when the reflection coefficient is equal to or less than about −10 dB (decibel), reflection of the antenna signal AS in the signal radiation pattern SRP_c is almost not generated. Referring to the first to fourth graphs G1 to G4 of FIG. 9A, in case that the fourth length SW2_b is about 3 mm, 3.1 mm, and 3.2 mm, the reflection coefficient is equal to or less than about −10 dB when the frequency of the antenna signal AS is about 26.8 GHz to about 27.2 GHz. Also, in case that the fourth length SW2_b is about 3.3 mm, the reflection coefficient is equal to or less than about −10 dB when the frequency of the antenna signal AS is about 26 GHz to about 27.2 GHz. Thus, when the antenna signal AS having the frequency of about 26.8 GHz to about 27.2 GHz is transmitted and received, the fourth length SW2_b may be one of about 3 mm, 3.1 mm, 3.2 mm, 3.3 mm. When the antenna signal AS having the frequency of about 26 GHz to about 26.8 GHz is transmitted and received, the fourth length SW2_b may be about 3.3 mm. Whether the broadband characteristic is obtained in case that the fourth length SW2_b is about 3.3 mm in comparison with the case in which the fourth length SW2_b is about 3 mm, 3.1 mm, or 3.2 mm or whether the fourth length SW2_b is about 3 mm, 3.1 mm, 3.2 mm, or 3.3 mm may be varied according to the third length SW1 and a shape of each of the openings SLT_c. However, the embodiment of the present disclosure is not limited thereto. For example, the fourth length SW2_b may be less than about 3 mm or greater than about 3.3 mm. In an embodiment of the present disclosure, when the frequency of the antenna signal AS is about 28 GHz, the fourth length SW2_b may have a length of about 1 mm to about 5.5 mm from a center of about 5.35 mm that is λ/2. Also, the fourth length SW2_b may have a length of about 6 mm to about 13 mm from a center of about 10.7 mm that is λ.

Referring to FIG. 9B, the gain coefficient of the antenna signal AS radiated from the signal radiation pattern SRP_c for each frequency of the antenna signal AS according to the variation of the fourth length SW2_b when each of the openings SLT_c has the constant third length SW1 is illustrated.

In an embodiment of the present disclosure, the reflection coefficient of the antenna signal AS is measured when the third length SW1 is fixed to about 3.3 mm, and the fourth length SW2_b is varied. A fifth graph G1_a represents the gain coefficient of the antenna signal AS radiated from the signal radiation pattern SRP_c for each frequency of the antenna signal AS when the fourth length SW2_b is about 3 mm. A sixth graph G2_a represents the gain coefficient of the antenna signal AS radiated from the signal radiation pattern SRP_c for each frequency of the antenna signal AS when the fourth length SW2_b is about 3.1 mm. A seventh graph G3_a represents the gain coefficient of the antenna signal AS radiated from the signal radiation pattern SRP_c for each frequency of the antenna signal AS when the fourth length SW2_b is about 3.2 mm. An eighth graph G4_a represents the gain coefficient of the antenna signal AS radiated from the signal radiation pattern SRP_c for each frequency of the antenna signal AS when the fourth length SW2_b is about 3.3 mm.

Referring to FIGS. 9A and 9B, when the fourth length SW2_b is about 3 mm at a point at which the frequency of the antenna signal AS is about 27 GHz, the reflection coefficient is equal to or less than about −10 dB, and the gain coefficient is about 0.8 dBi (decibels-isotropic). When the fourth length SW2_b is about 3.1 mm at a point at which the frequency of the antenna signal AS is about 27 GHz, the reflection coefficient is equal to or less than about −10 dB, and the gain coefficient is about 2.2 dBi. When the fourth length SW2_b is about 3.2 mm at a point at which the frequency of the antenna signal AS is about 27 GHz, the reflection coefficient is equal to or less than about −10 dB, and the gain coefficient is about 3 dBi. When the fourth length SW2_b is about 3.3 mm at a point at which the frequency of the antenna signal AS is about 27 GHz, the reflection coefficient is equal to or less than about −10 dB, and the gain coefficient is about 2.8 dBi.

Referring to FIGS. 3A and 10, the radiation pattern of the antenna signal AS radiated from the electronic device ED according to an embodiment of the present disclosure has a great directivity in the third direction DR3 that is the front surface of the electronic device ED. Thus, the antenna signal AS is radiated to the outside with the great directivity to the front surface of the electronic device ED through the signal transmission pattern STP and the signal radiation pattern SRP.

Referring to FIGS. 9A and 10, reliability of transmission and reception of the antenna signal AS through the electronic device ED may be improved by determining the length and the shape of each of the signal transmission pattern STP and the signal radiation pattern SRP in correspondence to the frequency of the antenna signal AS transmitted and received through the electronic device ED.

According to an embodiment of the present disclosure, the opening radiation pattern for radiating the antenna signal to the outside and the signal transmission pattern for transmitting the antenna signal to the opening radiation pattern may be disposed on the different layers of the electronic device. Through this, the electronic device capable of minimizing the space required for mounting the antenna module supporting the wireless communication and improving the reliability of the wireless communication may be provided.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Hence, the real protective scope of the present disclosure shall be determined by the technical scope of the accompanying claims.

What is claimed is:

1. An electronic device comprising:
   a display module including a display area on which an image is displayed and a non-display area adjacent to the display area;
   a lower module disposed below the display module to support the display module;
   a signal radiation pattern, wherein an opening is defined in the signal radiation pattern and configured to radiate an antenna signal to an outside and disposed to overlap the non-display area in the display module;
   a signal transmission pattern disposed between the display module and the lower module to radiate the antenna signal toward the signal radiation pattern; and
   an antenna controller disposed below the lower module to provide the antenna signal to the signal transmission pattern.

2. The electronic device of claim 1, wherein the signal transmission pattern is electrically insulated from the signal radiation pattern.

3. The electronic device of claim 2, wherein the signal transmission pattern is spaced apart from the signal radiation pattern.

4. The electronic device of claim 1, wherein the opening has a rectangular shape extending along the non-display area.

5. The electronic device of claim 4, wherein, if a length of the rectangular shape of the opening is referred to as an opening length, the opening length corresponds to a wavelength of the antenna signal.

6. The electronic device of claim 5, wherein when the wavelength of the antenna signal is λ, the opening length is λ.

7. The electronic device of claim 5, wherein when the wavelength of the antenna signal is λ, the opening length is λ/2.

8. The electronic device of claim 4, wherein the opening includes a plurality of openings, and
   each of the plurality of openings is spaced apart from each other.

9. The electronic device of claim 8, wherein the plurality of openings are spaced apart from each other along the non-display area.

10. The electronic device of claim 1, wherein the display module includes:
    a display element layer having a light emitting element; and
    a circuit element layer disposed below the display element layer to drive the light emitting element,
    wherein the light emitting element includes:
    a first electrode electrically connected with the circuit element layer;

a light emitting layer disposed on the first electrode; and
a second electrode disposed on the light emitting layer, and wherein the signal radiation pattern includes a same material as the second electrode.

11. The electronic device of claim 10, wherein the non-display area includes a first non-display area and a second non-display area,
the first non-display area is disposed between the display area and the second non-display area,
the second non-display area is an area on which an electrode of the circuit element layer, the first electrode, and the second electrode are not disposed, and
the signal radiation pattern overlaps the second non-display area.

12. The electronic device of claim 1, wherein the signal radiation pattern further includes a peripheral pattern disposed adjacent to the opening, and
the peripheral pattern comprises a plurality of meshes.

13. The electronic device of claim 1, further comprising an external case configured to accommodate the display module and the lower module,
wherein the signal radiation pattern contacts the external case.

14. The electronic device of claim 13, wherein the signal radiation pattern further includes a peripheral pattern adjacent to the opening, and
the opening is surrounded by the peripheral pattern and the external case.

15. The electronic device of claim 1, wherein the signal transmission pattern overlaps the signal radiation pattern on a plane.

16. The electronic device of claim 1, wherein the signal transmission pattern is not in overlap with the signal radiation pattern on a plane.

17. The electronic device of claim 1, wherein, when the non-display area extends in a second direction, the signal transmission pattern has a rectangular shape extending in a first direction crossing the second direction, and
when a length in the first direction of the signal transmission pattern is referred to as a transmission pattern length, the transmission pattern length corresponds to a length of a wavelength of the antenna signal.

18. The electronic device of claim 17, wherein the signal transmission pattern includes a plurality of signal transmission patterns, and
the signal transmission patterns are spaced apart from each other in the second direction.

19. The electronic device of claim 1, further comprising:
a metal layer disposed below the lower module; and
a connection electrode configured to electrically connect the signal transmission pattern and the antenna controller through a hole passing through the lower module and the metal layer,
wherein the signal transmission pattern receives the antenna signal from the antenna controller through the connection electrode.

20. The electronic device of claim 1, further comprising a metal layer disposed below the lower module,
wherein the antenna controller is disposed below the metal layer and electrically connected with the metal layer, and
the signal transmission pattern receives the antenna signal from the antenna controller through coupling with the metal layer.

* * * * *